UNITED STATES PATENT OFFICE.

WILLIAM ADAMSON AND CHARLES F. A. SIMONIN, OF PHILADELPHIA, PENNSYLVANIA, ASSIGNORS TO WILLIAM ADAMSON.

IMPROVEMENT IN MANURES FROM OFFAL, FLESH, &c.

Specification forming part of Letters Patent No. 119,000, dated September 19, 1871; reissue No. 5,612, dated October 21, 1873; application filed October 8, 1873.

DIVISION C.

*To all whom it may concern:*

Be it known that we, WILLIAM ADAMSON and CHARLES F. A. SIMONIN, of Philadelphia, county of Philadelphia, State of Pennsylvania, have invented an Improvement in Manure from Flesh, Offal, &c., of which the following is a specification:

Our invention consists of a manure or manure ingredient resulting from the treatment of animal and fecal substances, garbage, &c., with hydrocarbon vapors in closed vessels, the manure thus obtained containing more ammonia than ordinary manures made from animal matter.

Oils and fats have been extracted from animal matter by the direct application of liquid hydrocarbon; but the residuum was defective as a manure or manure ingredient, as it was deprived by the process of much of its ammonia. The process, moreover, involved a considerable waste of the fluid which was retained by the residuum after the fat had been extracted.

Fertilizers have also been prepared from offal and fish by passing air or gas, or gas charged with phenol vapors, through the mass, and subsequently drying the same with hot air; but this also, while to some extent extracting the oily and fatty matter which induces putrescence, deprived the residuum of its ammoniacal ingredients—a difficulty which we obviate by subjecting the flesh, offal, &c., to the vapors of hydrocarbon in a closed vessel.

Although different modes of carrying our invention into effect may be adopted, we prefer the following: The animal matter is placed on a perforated diaphragm in a closed vessel, which may be furnished with a suitable safety-valve, and beneath the diaphragm is introduced a supply of hydrocarbon, by preference such as is of a volatile character—benzine, benzole, gasoline, or naphtha, for instance—and this is vaporized by means of a steam-coil or otherwise. The vapor rises and permeates the mass of offal, carries off the moisture, and passes to a condenser, by which the vapor is restored to its original condition of liquid hydrocarbon.

The process is, by preference, conducted under more or less pressure, determined by a weighted valve in a pipe, through which the vapor passes to the condenser.

The extract, consisting of liquid hydrocarbon holding fatty and oily matter in solution, may be removed from time to time from the vessel through a suitable discharge-cock, and may be redistilled, in order to separate the fats from the hydrocarbons. The residuum, consisting of thoroughly-desiccated animal tissues deprived of all fatty and oily matter, is the manure or manure ingredient, the value of which is enhanced by the retention of the ammoniacal ingredients, due to the process of subjecting the offal to the vapor treatment in a closed vessel.

We claim as our invention—

A manure or manure ingredient consisting of flesh, offal, or other animal matter deprived of its fatty constituents and retaining the ammonia, as set forth.

In testimony whereof we have signed our names to this specification in the presence of two subscribing witnesses.

WILLIAM ADAMSON.
CHS. F. A. SIMONIN.

Witnesses:
WM. A. STEEL,
HARRY SMITH.